April 11, 1967   D. G. JELATIS ET AL   3,313,580
COMBINATION BEARING AND ROTARY MECHANICAL SEAL
Original Filed March 27, 1961
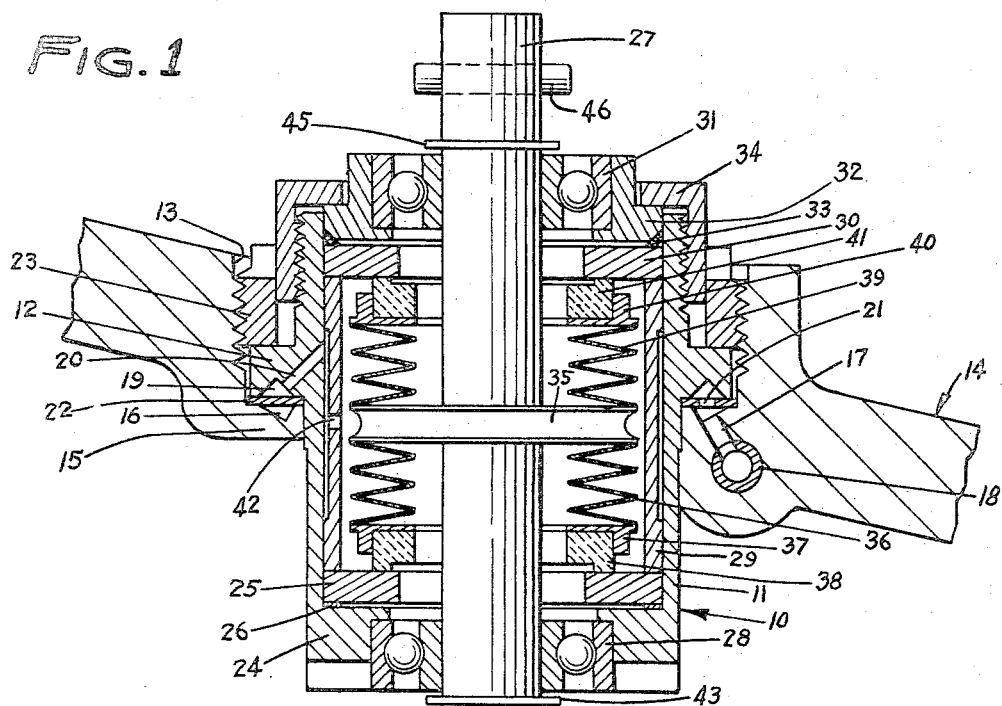
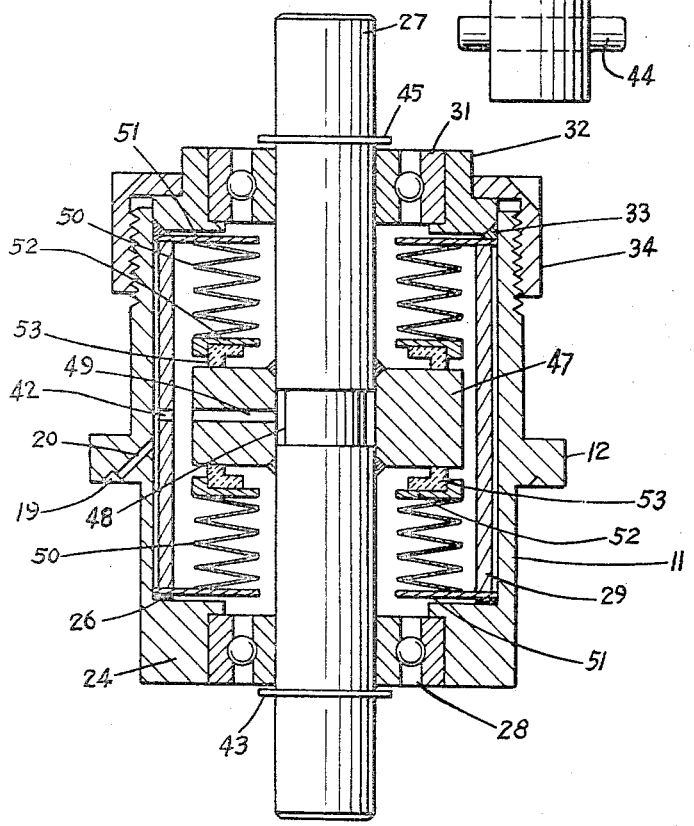

United States Patent Office 3,313,580
Patented Apr. 11, 1967

3,313,580
COMBINATION BEARING AND ROTARY
MECHANICAL SEAL
Demetrius G. Jelatis, Red Wing, Minn., Robert A. Olsen, Palatine, Ill., and Lester W. Haaker, Red Wing, Minn., assignors to Central Research Laboratories, Inc., Red Wing, Minn., a corporation of Minnesota
Application Sept. 13, 1963, Ser. No. 308,915, now Patent No. 3,260,530, dated July 12, 1966, which is a division of application Ser. No. 98,372, Mar. 27, 1961, now Patent No. 3,164,267, dated Jan. 5, 1965. Divided and this application June 7, 1965, Ser. No. 461,689
7 Claims. (Cl. 308—187.2)

This application is a division of application Ser. No. 308,915 filed Sept. 13, 1963 now Patent No. 3,260,530, granted July 12, 1966. Application Ser. No. 308,915 is a division of application Ser. No. 98,372 filed Mar. 27, 1961 now Patent No. 3,164,267 issued Jan. 5, 1965.

This invention relates to rotary mechanical seal means adapted to transmit rotary motion between differing environments separated by a tight sealed protective barrier.

The rotary mechanical seal of the present invention is adapted for use, for example, in the transmission of rotary motion through the walls of high level alpha-gamma hot cells, cells requiring complete atmosphere control for handling pyrophoric or otherwise atmosphere sensitive materials, cells handling highly toxic gaseous or air borne particulate materials under circumstances involving risk of dissemination by explosion or other accident, or similar installations. The mechanical seals are especially adapted for use in remote control master-slave manipulators in installations where it is desirable or imperative that the operator be in an environment completely sealed from the environment in which the slave arm of the manipulator functions. Such a manipulator is described and claimed in our copending application Ser. No. 98,372 filed Mar. 27, 1961, of which this application is a division.

The rotary mechanical seals may be pressurized with gas to serve as a lock permitting continuous monitoring of seal integrity. In the event of seal failure any resulting leak will only allow the innocuous pressurizing gas to escape while avoiding likelihood of transfer of hazardous material.

The rotary mechanical seal according to the present invention is illustrated in the accompanying drawings in which like numerals refer to corresponding parts and in which:

FIGURE 1 is an enlarged vertical elevation, in section, showing one exemplary rotary motion seal package or transfer unit; and FIGURE 2 is a vertical section showing a modified form of rotary seal construction.

Referring now to FIGURE 1 there is shown in detail a double rotary seal transfer assembly mounted in a barrier wall. The rotary mechanical seal indicated generally at 10 is in the form of a cylindrical tubular housing 11 having an annular outwardly extending flange or integral collar 12 located intermediate of its ends. The housing 11 extends through the opening 13 in the top surface of a barrier wall 14 with flange or collar 12 resting upon an inwardly extending flange 15 in the opening 13 to support the housing.

A gas tight gasket is interposed between the mating surfaces of the flanges 12 and 15 to prevent the passage of noxious substances from one side of barrier wall 14 to the other through the seal. The upper face inwardly extending flange 15 is provided with an annular groove 16. This groove communicates through port 17 with gas tube 18 which is connected to a source of monitoring gas under pressure. The bottom face of outwardly extending flange 12 is provided with a corresponding annular groove 19. A channel 20 extends through the cylindrical housing wall to communicate the interior of the housing with the groove 19. An opening 21 in the gasket 22 permits the annular grooves 16 and 19 to communicate for gas flow. The housing 11 is held tightly in place in the opening in the barrier plate by means of a nut 23.

The bottom end of cylindrical housing 11 is provided with an inwardly extending annular flange 24. A seal ring 25, formed of steel or other suitable material, is supported within the housing on the shoulder formed by the flange. A gas tight gasket 26 is interposed between the seal ring and flange. A vertical shaft 27 extends through and beyond the ends of the housing 11. The shaft 27 is journaled for rotation on the longitudinal axis of the housing in a ring ball bearing 28 mounted within the inwardly extending flange 24. An inner cylindrical tube 29 is disposed within the housing 11. One end of the inner tube 29 bears against the top surface of the seal ring 25. A second or top seal ring 30 is supported within the housing 11 by the top end edge of inner ring 29. The upper end of shaft 27 is journaled in a ring ball bearing 31 supported in a retaining ring 32 which bears against the top surface of seal ring 30. A gas tight gasket 33 is interposed between the retaining ring and seal ring. A threaded collar 34 maintains constant pressure upon the elements within the transfer package housing in order to maintain the integrity of the gasketed seals.

A disc 35 is secured to shaft 27 intermediate of its ends within the housing 11 to rotate with the shaft. A first metal bellows 36 is secured to the periphery of disc 35 with a gas tight connection. The opposite end of bellows 36 carries a retaining ring 37 in which is supported a carbon seal ring 38 which bears against the lapped top surface of seal ring 25 to form a rotary gas tight seal. A further bellows 39 is secured with a gas tight connection to the upper periphery of disc 35. The opposite end of bellows 39 carries a retaining ring 40 which supports a carbon seal ring 41 whose flat lapped surface bears against the flat lapped lower surface of seal ring 30 to form a gas tight rotary seal. It will be noted that upon rotation of shaft 27 the bellows and the carbon seal rings carried by them will rotate with respect to the stationary seal rings within the transfer assembly housing. Other resilient mounting means may be substituted for the bellows to support one of the seal rings.

The integrity of the seals may be constantly monitored by means of gas under pressure introduced through tubing 18 and port 17 to the annular groove 16 in the supporting flange for the rotary seal housing. The pressurized gas may pass through port 21 in gasket 22 to annular groove 19 in the lower surface of the flange 12 by which the rotary seal housing is supported. The gas then passes through port 20 to the interior of the rotary seal housing and through port 42 in the inner housing tube 29 to the chambers surrounding the bellows. Escape of gas is prevented by gaskets 22, 26 and 33 and the two rotary seals formed between the carbon seal rings 38 and 41 and seal rings 25 and 30, respectively. So long as the pressure on the monitoring gas remains substantially constant as observed on a gas pressure gauge the operator may be confident of the integrity of the gas seals. A substantial flow of the monitoring gas denotes the failure of one of the seals. It will be observed, however, that even in the event of the failure of a seal, the operator is in no danger of contamination by any noxious substance from the opposite side of the barrier wall because the flow of the escaping monitoring gas is outward from the rotary seal assembly and effectively prevents migration of any noxious substance through the rotary seal assembly.

The lowermost end of shaft 27 is fitted with a retaining ring 43 and a gear or pulley or other rotary motion transmission or coupling element may be keyed by pin 44 for rotation with the shaft.

The upper end of shaft 27 is provided with a retaining ring 45 and a gear or pulley or other rotary motion transmission or coupling element may be keyed by pin 46 for rotation with the shaft.

In FIGURE 2 there is shown an alternative form of rotary seal construction. The structure of the housing, shaft, bearings, etc., are the same as already described with reference to FIGURE 1. In the modified form of rotary seal structure a disc or ring 47 is soldered or welded or otherwise secured to shaft 27 intermediate of its ends with a gas tight connection. In order to permit monitoring of the solder or weld seal the shaft 27 is undercut at 48 and a gas port 49 is provided in ring 47. The opposite faces of the seal ring 47 are lapped to a fine finish. A bellows 50 is attached with a gas tight connection to a ring 51 which is sealed in the housing by virtue of the pressure of inner tube 29 bearing against gasket 26 and internal shoulder 24 of the housing. The opposite end of bellows 50 carries a retaining ring 52 in which is supported a carbon seal ring 53. The lapped surface of the carbon ring 53 remains stationary while the bottom lapped surface of seal ring 47 which it engages is rotated. The identical bellows structure is duplicated in the upper portion of the transfer assembly housing. Instead of the bellows as shown, equivalent resilient mounting means may be used to support one of the seal rings.

In this modified form of construction, the rotary seal surfaces are at the interface between the opposite surfaces of seal ring 47 and the carbon seal rings 53, but the carbon seal rings remain stationary while the seal ring 47, formed of steel or other suitable material, is rotated. The modified form of package may be subjected to gas under pressure to monitor the integrity of the seal, as heretofore described.

By means of use of the present invention, mechanical rotary motions are transferred mechanically through a sealed barrier in order to shield and protect one side of the barrier from any harmful effects of the environment of the other side. The integrity of the mechanical seals may be monitored at all times by means of gas under pressure. The fact of maintenance of the desired tight seal can be continuously observed by appropriate metering and alarm instrumentation between the gas pressure source and the seals. In the event of seal failure, not only may this fact be made immediately apparent, but the flow of gas in each instance is outward from the inside of the seal into the space on one side of the barrier wall or the other. There is no opportunity for flow through the seal mechanism of contaminating substances from one side of the barrier wall to the other.

It is apparent that many modifications and variations of this invention as hereinbefore set forth may be made without departing from the spirit and scope thereof. The specific embodiments described are given by way of example only and the invention is limited only by the terms of the appended claims.

We claim:
1. A combination bearing support and rotary mechanical seal for a shaft rotatable to transmit rotary motion through a barrier wall having an opening while preventing the transmission of a radio-active and similar dangerous substances comprising:
   (A) a housing including an enclosed chamber defined by a first cup-shaped member having an end wall with an axial opening and a second cup-shaped member having an end wall with an axial opening secured to the first cup-shaped member, one of said cup-shaped members having means for axially positioning said housing in the opening in said barrier wall,
   (B) a shaft extended axially through said first cup-shaped member and said second cup-shaped member,
   (C) bearing means positioned in the end wall openings and mounted on said end walls for rotatably supporting the shaft on said end walls,
   (D) at least one pair of mating seal ring surfaces enclosed within the housing chamber,
      (i) one of said seal ring surfaces being integral with a first seal ring surrounding said shaft, said seal ring having an inside diameter substantially larger than the diameter of said shaft whereby said first seal ring has limited lateral movement with respect to the adjacent mating seal ring surface,
      (ii) means for resiliently supporting said first seal ring for longitudinal movement along the axis of the shaft, said means comprising a thin flexible tubular gastight barrier wall surrounding said shaft and secured to said first ring in gas-tight relationship,
      (iii) the other of said seal ring surfaces being integral with a second seal ring surrounding the shaft and fixed against movement relative to the housing in a direction along the longitudinal axis of the shaft.

2. A combination bearing support and rotary mechanical seal for a shaft rotatable to transmit rotary motion through a barrier wall having an opening while preventing the transmission of a radio-active and similar dangerous substances comprising:
   (A) a housing including an enclosed chamber defined by a first cup-shaped member having an end wall with an axial opening and a second cup-shaped member having an end wall with an axial opening secured to the first cup-shaped member, one of said cup-shaped members having means for axially positioning said housing in the opening in said barrier wall,
   (B) a shaft extended axially through said first cup-shaped member and said second cup-shaped member,
   (C) bearing means positioned in the end wall openings and mounted on said end walls for rotatably supporting the shaft on said end walls,
   (D) two pair of mating annular seal ring surfaces enclosed within said housing chamber,
      (i) one of each said pairs of ring surfaces being integral with a first seal ring surrounding said shaft and mounted for rotation with the shaft,
      (ii) each seal ring surface of the other of said pairs of seal ring surfaces being integral with one of two second seal rings positioned on opposite sides of the first seal ring, said second seal rings having an inside diameter substantially larger than the diameter of said shaft whereby said second seal rings have limited lateral movement with respect to the adjacent mating seal ring surfaces,
      (iii) means for resiliently supporting said second seal rings for longitudinal movement along the axis of the shaft, said means comprising a pair of thin flexible tubular gastight barrier walls surrounding said shaft, (iv) first and second ring means positioned in said chamber around said shaft in sealed relationship with the end walls of the first and second cup-shaped members respectively opposite ends of said barrier walls secured to said first and second ring means respectively to hold said second seal rings against rotational movement relative to the housing, and (v) spacer means positioned in said chamber in engagement with said first and second ring means to axially space said ring means whereby the securing together of the first and second cup-shaped members clamps the first and second ring means in sealed relation with the end walls of the first and second cup-shaped members respectively.

3. A combination bearing support and rotary mechanical seal comprising:
   (A) a housing including an enclosed chamber defined by a side wall and opposite end walls having axially aligned openings,
   (B) a shaft extended axially through said openings and journalled on said end walls for rotation relative thereto,
   (C) first and second annular means positioned in said chamber, said first means positioned in sealed relationship with one end wall and said second means positioned in sealed relationship with the other end wall,
   (D) spacer sleeve means positioned in said chamber adjacent said side wall, said sleeve means have opposite ends in engagement with the first and second means respectively to axially space said first and second means,
   (E) transverse disc means located in said chamber and secured to said shaft,
   (F) a pair of seal rings surrounding said shaft and located on opposite sides of the disc means, and
   (G) gastight resilient means surround said shaft and secured to said pair of seal rings, said resilient means secured to said annular means for resiliently supporting the seal rings and biasing the same into sealing engagement with the disc means.

4. A combination bearing support and rotary mechanical seal comprising:
   (A) a housing including an enclosed chamber defined by a side wall and opposite end walls having axially aligned openings,
   (B) a shaft extended axially through said openings and journalled on said end walls for rotation relative thereto,
   (C) first and second annular means positioned in said chamber, said first means positioned in sealed relationship with one end wall and said second means positioned in sealed relationship with the other end wall,
   (D) spacer sleeve means positioned in said chamber adjacent said side wall, said sleeve means have opposite ends in engagement with the first and second means respectively to axially space said first and second means,
   (E) transverse disc means located in said chamber and secured to said shaft,
   (F) a pair of seal rings surrounding said shaft and located on opposite sides of the disc means, and
   (G) gastight resilient meanst surround said shaft and secured to said pair of seal rings, said resilient means secured to said disc means for resiliently supporting the seal rings and biasing the same into sealing engagement with the annular means.

5. A combination bearing and seal assembly comprising:
   (A) a housing having an enclosed chamber defined by a tubular sidewall, a first end wall secured to one end of the sidewall and a second end wall adjustably attached to the other end of the sidewall, said end walls having axially aligned openings,
   (B) a shaft projected axially through said openings in the end walls,
   (C) bearing means mounted on said first end wall and second end wall journalling said shaft on said end walls,
   (D) first and second annular means positioned in said chamber, said first means positioned in sealed relationship with the first end wall and said second means positioned in sealed relationship with the second end wall,
   (E) spacer sleeve means positioned in said chamber adjacent said sidewall, said sleeve means having opposite ends in engagement with the first and second annular means respectively to axially space said first and second annular means, said adjustable end wall holding said first and second annular means and the spacer sleeve means in relative assembled relation,
   (F) transverse disc means secured to said shaft, said disc means located in said chamber between said first and second annular means,
   (G) a pair of sealing rings surrounding said shaft and located on opposite sides of the disc means, and
   (H) gastight resilient means surrounding said shaft and secured to said pair of seal rings and to said first and second annular means for resiliently supporting the seal rings and for biasing the seal rings into sealing engagement with opposite sides of the disc means.

6. A combination bearing and seal assembly comprising:
   (A) a housing having an enclosed chamber defined by a tubular sidewall, a first end wall secured to one end of the sidewall and a second end wall adjustably attached to the other end of the sidewall, said end walls having axially aligned openings,
   (B) a shaft projected axially through said openings in the end walls,
   (C) bearing means mounted on said first end wall and second end wall journalling said shaft on said end walls,
   (D) first and second annular means positioned in said chamber, said first means positioned in sealed relationship with the first end wall and said second means positioned in sealed relationship with the second end wall,
   (E) spacer sleeve means positioned in said chamber adjacent said sidewall, said sleeve means having opposite ends in engagement with the first and second annular means respectively to axially space said first and second annular means, said adjustable end wall holding said first and second annular means and the spacer sleeve means in relative assembled relation,
   (F) transverse disc means secured to said shaft, said disc means located in said chamber between said first and second annular means,
   (G) a pair of sealing rings surrounding said shaft and located on opposite sides of the disc means, and
   (H) gastight resilient means surrounding said shaft and secured to said pair of seal rings and to said disc means for resiliently supporting the seal rings and for biasing the seal rings into sealing engagement with the first annular means and the second annular means.

7. A combination bearing and seal assembly for rotatably mounting a shaft on a barrier wall having an opening for receiving the assembly comprising:
   (A) a housing having an enclosed chamber defined by a first cup-shaped member having an end wall with an axial opening and a second cup-shaped member having an end wall with an axial opening, said first and second cup-shaped members being secured together, one of said cup-shaped members having means for axially positioning said housing in the opening in said barrier wall,
(B) a shaft projected axially through said first cup-shaped member and said second cup-shaped member,
(C) bearing means positioned in the end wall openings of the cup-shaped members and mounted on said end walls for rotatably supporting the shaft on said housing, and
(D) seal means located within the enclosed chamber coacting with the housing and shaft to prevent transmission of substances through the housing.

References Cited by the Examiner

UNITED STATES PATENTS

| | | | |
|---|---|---|---|
| 1,617,549 | 2/1927 | Schramm | 277—61 X |
| 1,802,813 | 4/1931 | Greenwald | 277—61 X |
| 2,313,169 | 3/1943 | Penick. | |
| 3,005,518 | 10/1961 | Jassniker. | |

FOREIGN PATENTS 159,796  11/1954  Australia.

SAMUEL ROTHBERG, *Primary Examiner.*